March 13, 1945.     A. G. RUFF ET AL     2,371,472
CART
Filed June 26, 1942     2 Sheets-Sheet 1

Inventor
Arthur G. Ruff
Anna Powers Buer
By Clarence A. O'Brien
and Harvey B. Jacobson
Attorneys March 13, 1945.  A. G. RUFF ET AL  2,371,472
CART
Filed June 26, 1942  2 Sheets-Sheet 2
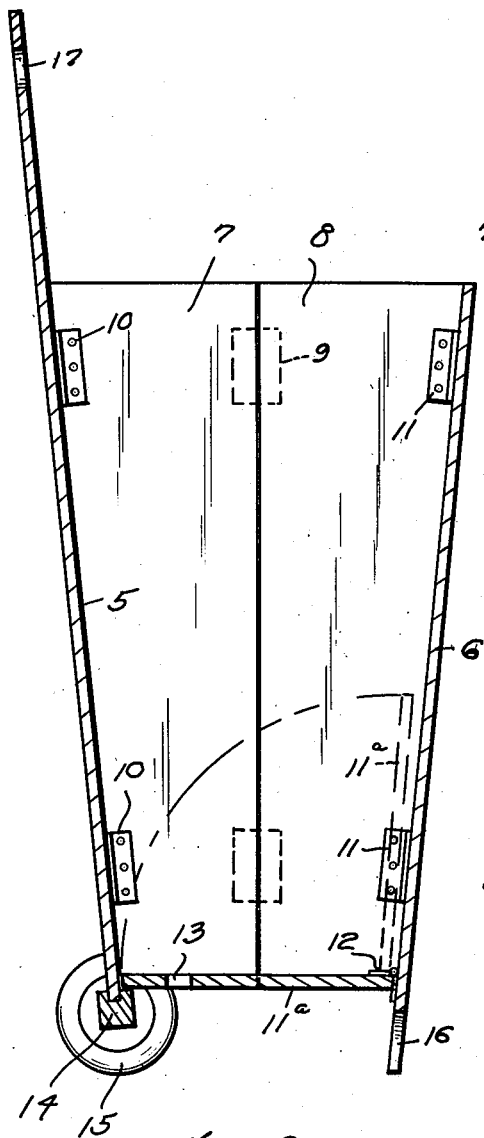
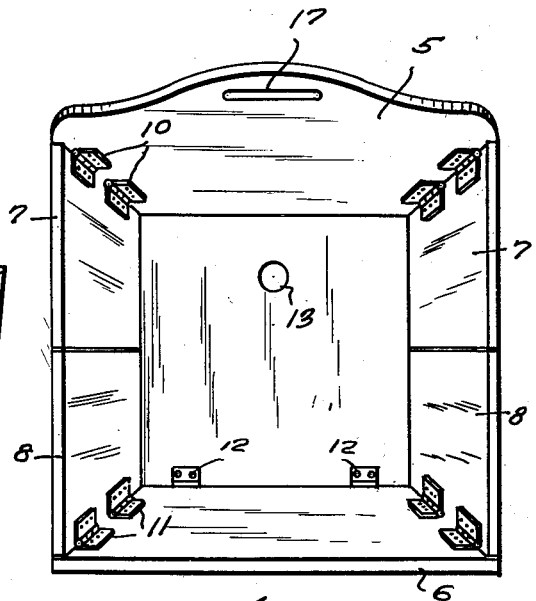
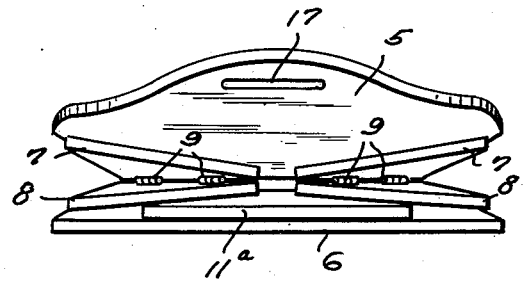
Inventor
Arthur G. Ruff
Anna Powers Buer
By Clarence A. O'Brien
and Harvey B. Jacobson
Attorneys Patented Mar. 13, 1945

2,371,472

UNITED STATES PATENT OFFICE 2,371,472

CART

Arthur George Ruff and Anna Powers Buer, Cincinnati, Ohio

Application June 26, 1942, Serial No. 448,636

3 Claims. (Cl. 280—36)

This invention relates to new and useful improvements in carts adapted to be used by housewives in carrying groceries and various other articles while on shopping tours.

The principal object of the present invention is to provide a cart which can be readily collapsed and disposed in a small storage space when not in use.

Another important object of the invention is to provide a cart which can be pushed with ease and which will have a capacity for quite a number of articles.

Still another important object of the invention is to provide a cart of the character stated which will be constructed almost entirely of wood, thus economizing on the more scarce material, metal.

Other objects and advantages of the invention will become apparent to the reader of the following description.

In the drawings:

Figure 3 is a vertical section on the line 3—3 of Figure 2.

Figure 4 is a top plan view showing the cart open.

Figure 5 is a top plan view showing the cart collapsed.

Figures 1, 2:
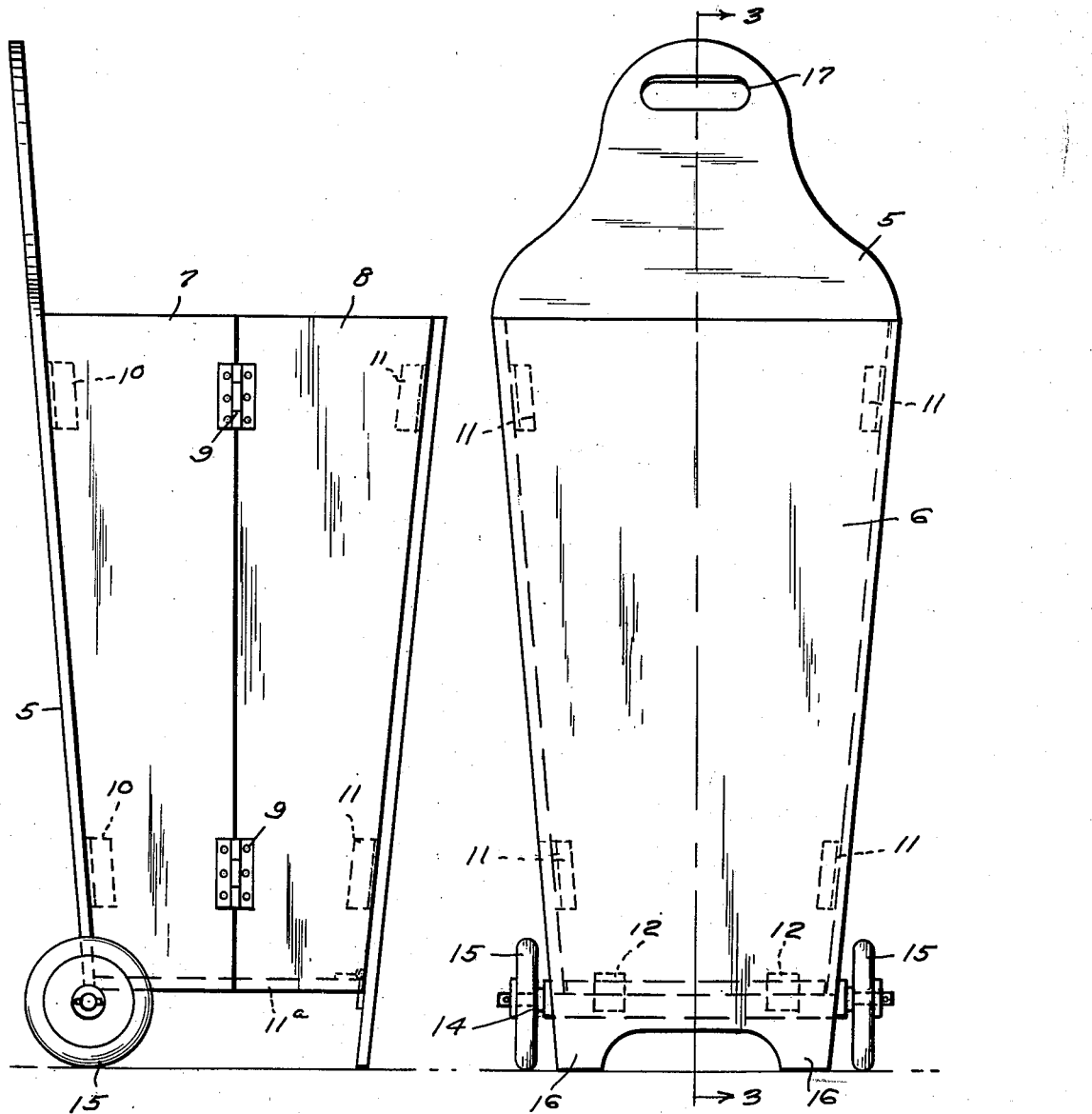
Figure 1 represents a side elevational view of the cart.
Figure 2 is a back elevational view.

Referring to the drawings, wherein like numerals designate like parts, it can be seen that numeral 5 denotes an elongated back wall which is substantially longer than a front wall 6. Each side has a pair of panels 7, 8 hingedly connected together as at 9 so as to hinge inwardly as suggested in Figure 5. The remaining edges of the panels 7 are hingedly connected as at 10 to the side edges of the back wall 5, while the remaining edges of the panels 8 are hingedly connected as at 11 to the side edges of the front wall 6.

As is clearly shown in the drawings, the walls 5, 6 as well as the panels 7, 8 taper downwardly so as to define a downwardly tapering receptacle when the cart is in opened position.

Numeral 11a denotes a bottom hingedly secured at one edge thereof as at 12 to the lower portion of the front wall 6 and this bottom has a finger receiving opening 13 for facilitating the lifting of the bottom to the dotted line position shown in Figure 3.

The lower edge of the back wall 5 seats in a groove top of a wooden cross member 14 and is preferably cemented thereto. On the ends of this cross member 14 are mounted wooden wheels 15.

The edge of the bottom wall 11a opposite the hinged edge thereof rests on the cross member 14.

The lower end of the front wall 6 is cut out to form a pair of short legs 16, which in conjunction with the wheels 15 serve as a support in holding the cart in upright position.

The upper portion of the back wall 5 projects upwardly well above the upper edges of the panels 7, 8 and the front wall 6 and has a hand receiving slot 17 therein.

It can now be seen, that in order to collapse the cart, the bottom 11a is raised to the broken line position shown in Figure 3, after which the panels 7, 8 are swung inwardly and the walls 5, 6 forced together. Thus the cart will be collapsed to the reduced formation shown in Figure 5 and in this position can be stored in a very small space, as on a shelf in a closet.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a cart of the class described, an elongated body comprising back and front walls, respectively, side walls, and a bottom wall, said back, front and side walls converging toward said bottom wall, the side walls each comprising a pair of panels hinged together with one panel hinged to the back wall and the other hinged to the front wall whereby said side walls are foldable inwardly to collapse said body, said bottom wall being hinged at one edge to the front wall to fold inwardly when said body is collapsed, and a wheel supported bar in which the bottom of the back wall is rabbeted and secured, said bar providing a ledge extending across the back wall, and the edge of the bottom wall, opposite the hinged edge of said bottom wall resting upon said ledge when said bottom wall is unfolded.

2. In a carrier of the class described, the combination of a circumferentially continuous body member forming openings at its top and bottom, said body member comprising front and back sections, between which are disposed side sections connected to each other and connected respectively to said front and back sections whereby said side sections are adapted to fold inwardly and enable the front section to be disposed proximate said back section and when disposed in a position normal to said front and back sections to fix the distance between said sections, handle means secured to and extending upwardly from said back section, an axle, supporting wheels carried by said axle, means mounting said axle on said body member proximate the lower edge of said back section, a bottom disposed within said body member between said front and back sections for spreading and spacing the same from each other, and hinge means mounting said bottom for movement to and from a position parallel to the axis of said body member.

3. In a carrier of the class described, the combination of a hollow substantially rectangular body member, said body member comprising front and back sections, between which are disposed side sections foldably connected to each other and foldably connected respectively to said front and back sections whereby said side sections are adapted to fold inwardly and enable the front section to be disposed adjacent said back sections and also adapted to be disposed in a position normal to said front and back sections and fix the distance between said sections, handle means secured to and extending upwardly from said back section, an axle, supporting wheels carried by said axle, means mounting said axle on said back section proximate the lower edge thereof so that the supporting wheels extend below said body member, a bottom disposed within said body member between said front and back sections for spreading and spacing the same from each other, and hinge means mounting said bottom for movement to and from a position parallel to the axis of said body member.

ARTHUR GEORGE RUFF.
ANNA POWERS BUER.